US000001954H

(19) United States

(12) Statutory Invention Registration

Takashima

(10) Reg. No.: US H1954 H

(43) Published: Apr. 3, 2001

(54) ENVIRONMENTALLY FRIENDLY INFORMATION STORAGE DISC PACKAGING SYSTEM

(75) Inventor: Sandra A. Takashima, San Francisco, CA (US)

(73) Assignee: Oracle Corporation, Redwood Shores, CA (US)

(21) Appl. No.: 09/497,912

(22) Filed: Feb. 3, 2000

(51) Int. Cl.[7] ..... B65D 85/57

(52) U.S. Cl. ..... 206/308.1

*Primary Examiner*—Harold J. Tudor

(74) *Attorney, Agent, or Firm*—Chris J. Brokaw

(57) ABSTRACT

A packaging system is provided for shipping optical media, such as compact discs (CDs), digital video discs (DVDs), and compact disc recordables (CDRs), in an environmentally responsible and cost effective manner. The packaging system's construction uses primarily recyclable material and requires far less raw material than other shipping packaging options. The packaging system is also lightweight and suitably durable for passage through the normal shipping channels, such as the United States Postal Service. The packaging system may be easily configured to accommodate different numbers of optical media discs.

10 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENVIRONMENTALLY FRIENDLY INFORMATION STORAGE DISC PACKAGING SYSTEM

FIELD OF THE INVENTION

This invention relates to packaging devices for optical media, and more particularly, to an environmentally responsible and cost effective packaging system to distribute large quantities of related optical media to customers through mail services, such as the United States Postal Service, UPS, Federal Express, and the like.

BACKGROUND OF THE INVENTION

Optical media are small optical discs upon which large amounts of digital information, such as audio-visual data and software, are encoded. Common examples of optical media include, but are not limited to, the common compact disc (CD), the digital video disc (DVD), and the compact disc recordable (CDR). Other types of optical media using different formats than those listed above to store encoded data will likely be developed in the future.

The invention will be explained in reference to storing optical media. However, just as new types of optical media formats are likely to be developed in the future, so are other forms of storage formats that use disc structures just as likely to be developed. Other storage formats developed in the future may encode information on a disc through magnetic means or through scoring on the disc surface, to name a few. As the described packaging system is designed to accommodate any type of storage disc, it is understood that reference to optical media is by means of illustration, and not by limitation. The present invention is not limited to any particular type of format for storing information on a disc.

Due to its convenience and low cost of production, the use of optical media has quickly become the preferred method of storing not only music but software and movies as well. In the regular course of business, it is typical for one to purchase a software license or a music CD without receiving the physical disc at the time of purchase. As Internet commerce flourishes through the widespread use of the World Wide Web, an increasing number of people will buy goods and services through electronic storefronts. Accordingly, the need to ship optical media, perhaps with accompanying documentation, will also increase in time.

A single purchase of a software license, music album, or other optical media purchase may involve more than one physical optical media disc. For example, many music albums are labeled as "2 CD sets," as they contain two compact discs encoded with music. Larger musical collections that are encoded on larger numbers of optical media discs are also common. A single software license may require the installation of data stored upon multiple optical media discs as well. Accordingly, there will be an increasing need to distribute large numbers of related optical media discs through mail services.

As optical media are susceptible to scratching, smudging, and other signal eroding damage, they are preferably protected in a protective enclosure when not in use.

There have been several different approaches in developing packaging systems for optical media. A widely used package is the "jewel case." The conventional jewel case includes a rigid plastic front panel, a rigid plastic back panel, and a semi-flexible plastic disc holder which is secured into the plastic back panel. The front and back panels of the jewel case are normally hinged along one edge to open like a book.

At least one preprinted insert is included in and visible through the jewel case. The jewel case is shipped with a plastic shrink-wrap exterior, which is removed upon purchase.

This jewel case, though attractive in appearance, is cumbersome, expensive to construct, and not sufficiently durable to send through the mail without additional packaging. Additionally, the jewel case is not suited to address the problem of disseminating and storing mass quantities of optical media, as it was designed to be a personal storage container for the individual consumer upon purchase of a single optical media disc. Further, the construction and use of a jewel case requires a significant amount of plastic, which is a non-biodegradable material that can pose environmental problems.

U.S. Pat. No. 5,236,081 (the '081 patent) is directed to a storage device for optical media for the dual purpose of deterring theft while on display in retail stores and protectively storing the optical media while not in use.

While the described storage device in the '081 patent uses less non-biodegradable material in its construction, it still requires the use of plastic and a shrink-wrapped exterior. Additionally, it was designed to accommodate only a single compact disc. Further, the construction of the storage device would not be suitable or sufficiently durable for passage through the mail, as it was designed to be used strictly in retail outlet stores.

As limited environmentally responsible packaging is available to address the needs of distributors of optical media, less than ideal shipping practices are accepted as a matter of course.

For example, the process of shipping a single optical media disc from the distributor to a customer is both unnecessarily expensive and requires far too many non-biodegradable shipping materials. Typically, each compact disc is shipped in an individual jewel case. Each jewel case is then shrink wrapped for protection and security. Each jewel case is shipped in a product box, which is sufficiently larger than the jewel case and has an expensive high gloss finish exterior with lettering and artwork. Each product box may contain additional documentation and inserts, as well as a cardboard insert to hold the contents of the product box in place. The product box construction is expensive, requires excess amounts of raw materials, and is quite heavy. The extra weight of the product box increases the cost of shipping. The product box is enclosed within another heavier and more durable cardboard shipping box for protection during shipment. Additional packaging filler will also be added to the cardboard shipping box to protect the enclosed product box.

Using this packaging system, the single optical media disc is first packaged within a plastic box, further packaged in another cardboard product box, further surrounded by packaging filler material, all of which is enclosed in another cardboard shipping box. This process uses far to much non-biodegradable raw material to produce a package that is costlier to produce and ship than need be.

This problem is compounded when more than one related optical media disc is shipped. Rather than combining the contents of the product boxes, optical media are still packaged as individual units in product boxes, all of which are then enclosed in a cardboard shipping box for distribution.

This process is inefficient and undesirable on multiple fronts. The process requires the use of raw materials that are not sustainable, and thus, harmful to the environment. The process also requires much more packaging material per optical media disc than need be, which results in a higher cost to package an optical media disc for shipment. The process also yields a package that is far heavier than need be, which results in a higher cost to ship the package of compact discs.

Based on the foregoing, it is clearly desirable to provide a method and apparatus for shipping variable amounts of optical media through the mail services in an environmentally conscious and cost-effective manner.

SUMMARY OF THE INVENTION

Accordingly, it is a purpose of the present invention to provide an optical media package which minimizes excess material in its construction.

It is another purpose of the present invention to provide an optical media package which is less costly to produce.

It is another purpose of the present invention to provide an optical media package which is more ecological since the components thereof require less raw material and the nature of which is biodegradable.

It is another purpose of the present invention to provide an optical media package that is as lightweight as possible, as to minimize cost of shipment through package delivery services.

It is another purpose of the present invention to provide an optical media package that is durable enough to be appropriate for delivery through package delivery services.

Finally, it is another purpose of the present invention to provide an optical media package that may be easily configured to accommodate a wide range of numbers of optical media discs.

To achieve the foregoing and other purposes of the present invention, there is provided, in one embodiment, an optical media package comprised of sleeves, each of which store an optical media disc, affixed to a cover which houses and protects the sleeves. The sleeves are attached to the cover in such a manner as to allow any number of sleeves to be easily added or removed. This flexibility allows the optical media package to accommodate a range of sleeve numbers. Additionally, the cover and sleeves are preferably constructed from a durable, lightweight material that is environmentally sustainable.

In certain preferred embodiments, the sleeves are constructed with a white clay coating on the interior of the sleeve, which helps protect the optical media. The sleeves may also each be constructed with a mechanism to secure an optical media disc within the sleeve. The mechanism to secure an optical media disc within each sleeve will preferably be a bended corner which both prevents the optical media disc from sliding out of the sleeve and keeps the optical media from moving around in the sleeve.

As previously mentioned, the number of sleeves may be changed with ease to accommodate different numbers of optical media. The mechanism to perform this action may take a variety of different embodiments. In one embodiment, such a mechanism employs a plurality of elastic cords. The elastic cords are threaded through holes in the sleeves and cover, and each end of the elastic cords are be attached to a securing means which secures the elastic cords to the cover. The securing means preferably is easily removable to allow alteration of the number of sleeves that are secured to the cover.

In certain embodiments, the cover may be closed by securing the front panel of the cover to the back panel of the cover by an elastic strap affixed to the back panel, which may be wrapped around the cover. This arrangement, in addition to securing the cover in a closed position, adds additional support by securing the sleeves in place within the cover. Alternately, the front and back panels of the cover may be secured together by either Velcro straps, buttons, snaps, or tabs located on one, both, or either of the front or back panels of the cover.

The cover and sleeves may be housed in an appropriately sized shipping box for delivery. The shipping box should just be large enough to accommodate the cover and sleeves, thus reducing the excess shipping material and the need to use packaging filler to secure the contents of the shipping box. This small and lightweight shipping box may contain any number of optical media, and it is durable enough to be inexpensively shipped through the mail. In contrast to the prior example, there is no product box or extra filler material needed in this packaging system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The present invention is illustrated by way of example, and not by way of limitation, in the figures of the accompanying drawings in which like reference numerals refer to similar elements and in which.

DESCRIPTION OF THE PREFERRED EMBODIMENTS

The preferred embodiments of the optical media package according to the present invention will now be fully described with reference to FIGS. 1–3.

Figure 1:
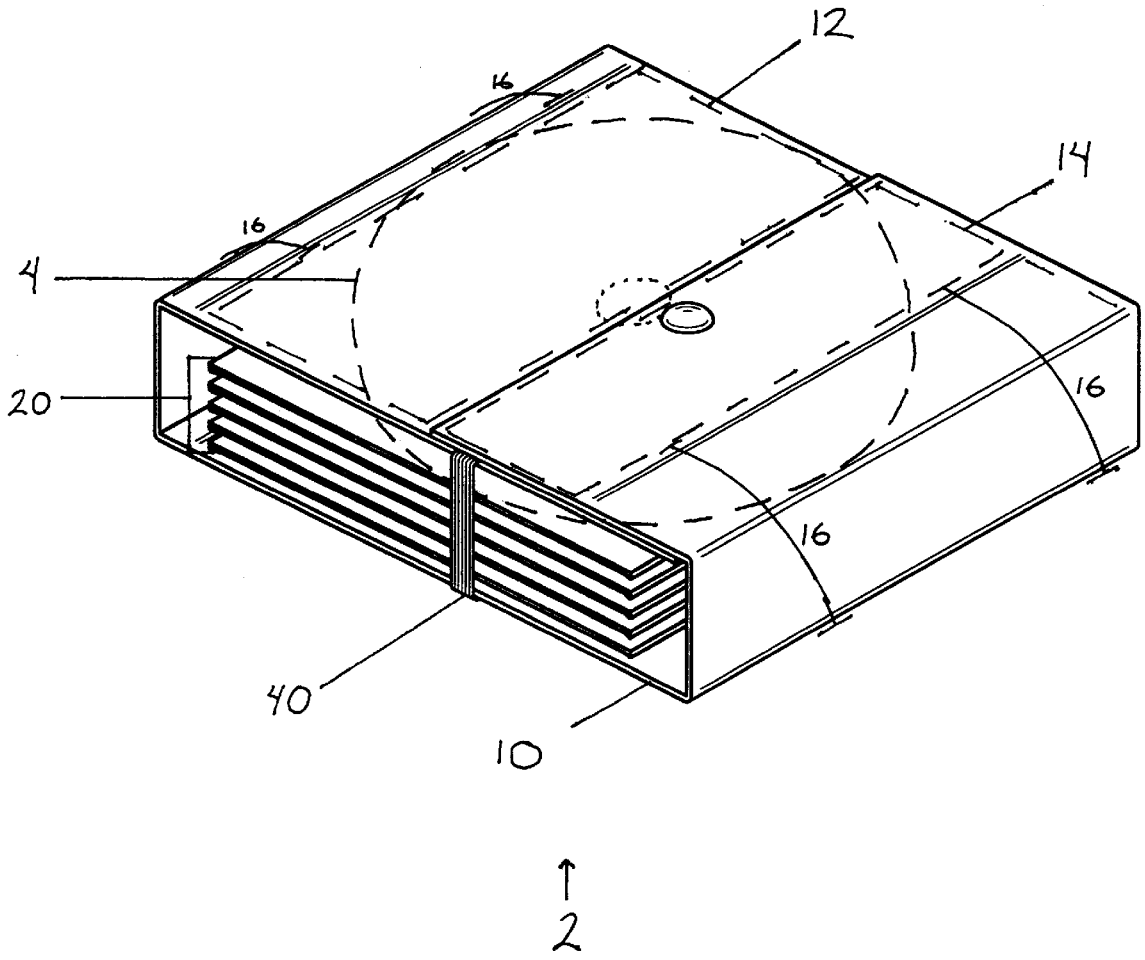
FIG. 1 is a perspective view of a preferred optical media package with the cover in a closed position.

FIG. 1 shows an optical media package 2 in a closed position according to one embodiment of the present invention. The optical media package 2 includes a cover 10 to encapsulate and protect a plurality of enclosed optical media discs 4. The cover 10 is preferably constructed from a single piece of durable, biodegradable material, such as Kraft. The cover 10 comprises a front panel 12 and a back panel 14, which may be closed and secured. The cover 10 also comprises a rolled spine 16, which allows the cover to accommodate different numbers of optical media discs to be stored within the confines of the cover 10. The rolled spine 16 is constructed by scoring the cover 10 in regular increments parallel to the shorter dimension of the cover 10. The rolled spine 16 allows the thickness of the optical media package to be adjustable to accommodate a plurality of sleeves 20.

Figure 2:
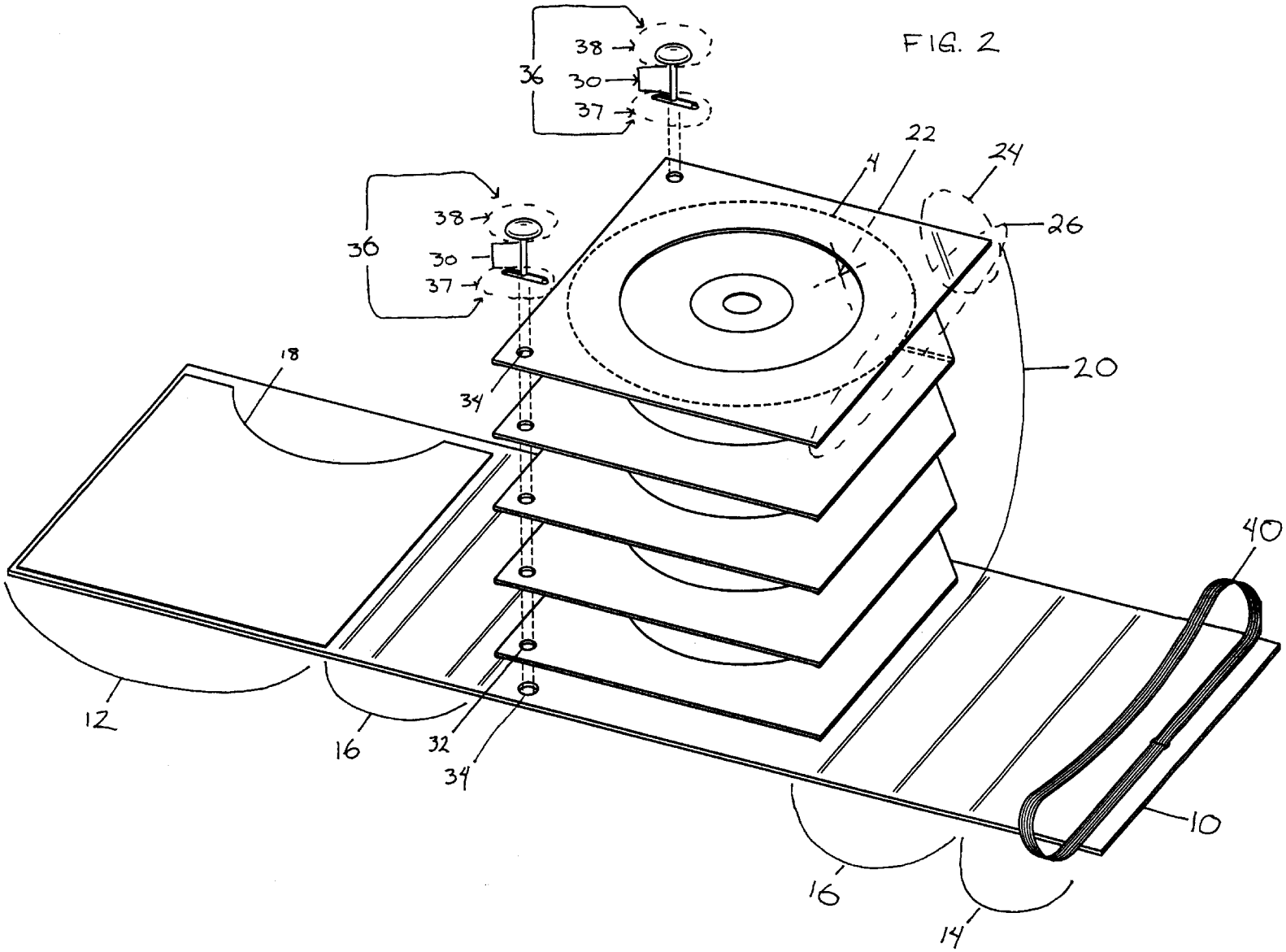
FIG. 2 is an exploded view of the optical media package of FIG. 1 with the cover in an open position.
Figure 3:
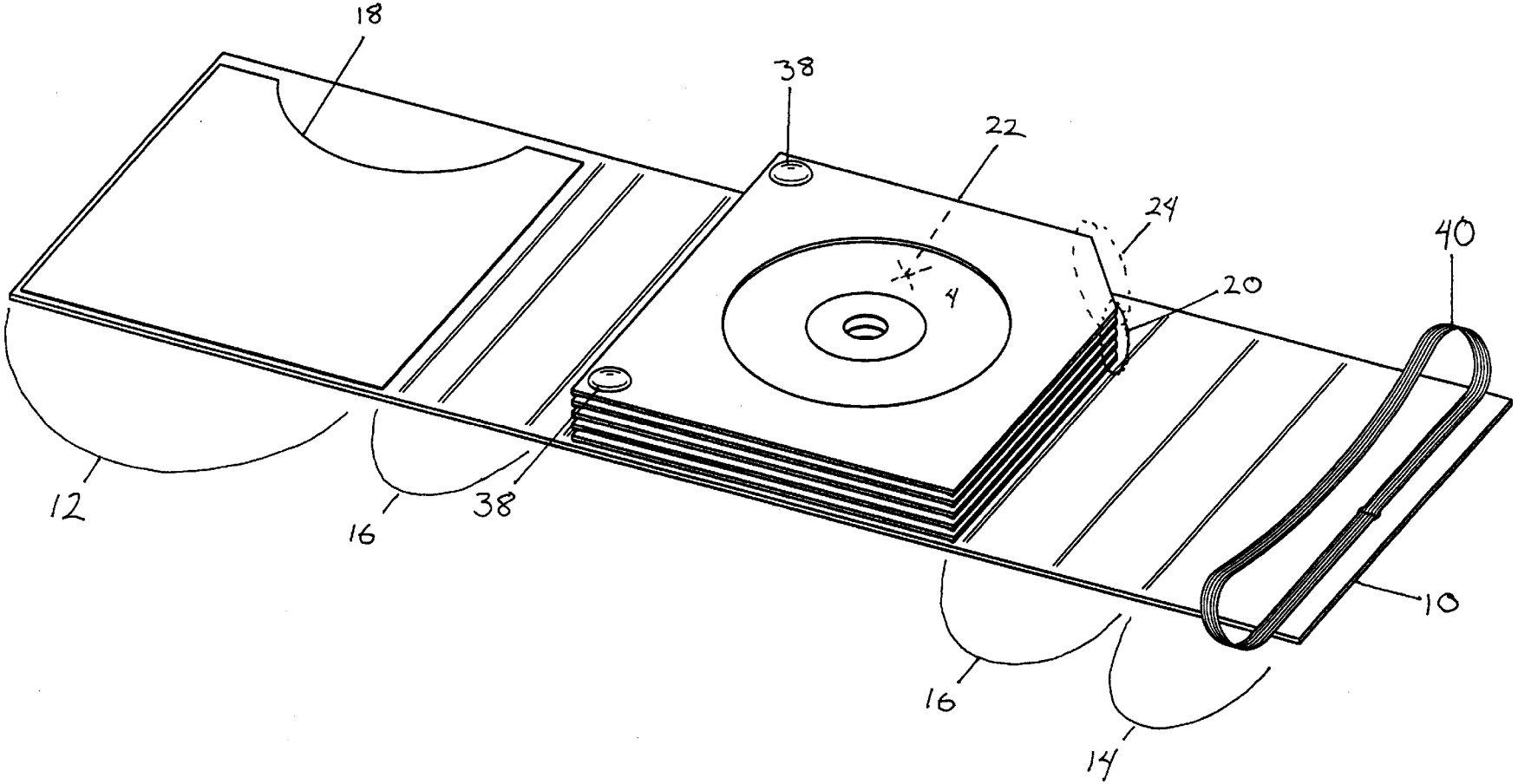
FIG. 3 is a perspective view of the optical media package of FIG. 1 with the cover in an open position.

FIG. 2 shows an exploded view of the optical media package in an open position according to one embodiment of the present invention. FIG. 3 shows a perspective drawing of the optical media package in an open position according to one embodiment of the present invention. Both FIG. 2 and FIG. 3 will be referenced in the description below to illuminate the embodiments of the invention.

The contents of the package 2 may be accessed by placing the cover 10 in an open position as shown in FIG. 2 and FIG.

3. The front panel 12 of the cover 10 may have a pocket 18 on the interior of the cover 10 for the purposes of housing product documentation. To reduce the size of the product documentation, it will typically be encoded on the optical media or, alternatively, reference will be made to a web URL where the product documentation may be found over the Internet.

The optical media discs are stored within the cover 10 in a plurality of sleeves 20. The plurality of sleeves 20 are constructed using any durable, biodegradable material, preferably using Kraft material. The plurality of sleeves 20 each have an interior 22 that is covered in a white clay coating. The white clay coating serves to protect the encoded surface of the optical media discs against scratching, smudging, or contact with fibers from the Kraft material. Additionally, the white clay coating is biodegradable.

The optical media may be secured in the plurality of sleeves 20 by a number of means. Preferably, each of the plurality of sleeves 20 will have a bended corner 24 to reduce the aperture of the sleeve to a length shorter than the diameter of the optical media, which prevents the optical media from falling out of the sleeve. The bended corner 24 further provides a wedge to secure the optical media in place within the sleeve, which advantageously reduces movement of the optical media disc during shipping. Each of the plurality of sleeves has an open end 26 from which the optical media may be inserted or retrieved. The bended corner 24 may be constructed by scoring one end of each of the plurality of sleeves 20 allowing that corner to be bent inwards towards the interior 22 so that the corner of the sleeve will rest against the optical media in the interior 22 of the optical media when it is stored within the sleeve.

Alternately, the plurality of sleeves 20 could employ any number of means not shown to secure the optical media within the interior portion 22. The open end 26 of each the plurality of sleeves 20 could alternatively be secured by the employment of a zipper on the open end 26 on each of the plurality of sleeves 20, the employment of a snap on the open end 26 on each of the plurality of sleeves 20, or equivalent mechanisms to secure the optical media discs within the plurality of sleeves 20.

As previously mentioned, the number of the plurality of sleeves 20 may be altered to accommodate a variety of numbers of optical media discs through the use of a plurality of elastic cords 30. A plurality of elastic cords 30 are threaded through holes in the sleeves 32 and through holes in the cover 34. Each end of the elastic cords 30 is attached to a securing means 36 which secures the plurality of elastic cords 30 to the cover 10. The securing means 36 advantageously allows removal to allow one to alter the number of the plurality of sleeves 20 secured to the cover 10. There are two types of securing means 36: functional securing means 37 and decorative securing means 38. Both the functional securing means 37 and the decorative securing means 38 will be explained in further detail below.

The functional securing means 37 consists of an object attached to an end of one of the plurality of elastic cords 30 and which, from at least one perspective, is smaller in length than the diameter of the hole in the cover 34, and from another perspective, is larger in length than the diameter from the hole in the cover 34.

The decorative securing means 38 consists of an object attached to an end of one of the plurality of elastic cords 30 which is larger in length than the diameter of the hole in the cover 34 from any perspective.

One may configure the securing means 36 to a secured position by first, threading the functional securing means 37 through the holes in the sleeves 32 and the holes in the cover 34 and second, positioning the functional securing means against the hole in the cover 34 so that the longer end of the attached object prevents the functional securing means 37 from movement through the hole in the cover 34. Likewise, one may configure the securing means 36 to an unsecured position by first, positioning the functional securing means 37 against the hole in the cover 34 so that it may be threaded through the hole in the cover 34 and second, threading the functional securing means 37 and elastic cord 30 through the holes in the cover 34 and holes in the sleeves 32. In an unsecured position, one may change the number of the plurality of sleeves 20 attached to the cover 10.

The functional securing means 37 should be constructed with a rod shaped object consisting of a sustainable, biodegradable material. The decorative securing means 38 should also be constructed with an object consisting of a sustainable, biodegradable material, and may be ordained with a logo, name, or design. The plurality of elastic cords 30 should be made from a sustainable, biodegradable material with elasticity.

The cover 10 may be closed by securing the front panel 12 of the cover 10 to the back panel 14 of the cover 10 by several embodiments. One embodiment takes the form of an elastic strap 40 affixed to the back panel 14. To secure the cover 10 in place, the front panel 12 of the cover 10 is folded up to rest against the plurality of sleeves 20, the back panel 14 is folded up against the front panel 12, and the elastic strap 40 wraps around the package parallel to the open end of the plurality of sleeves 20. By using an elastic strap 40 and wrapping as so described, the plurality of sleeves 20 have additional support to remain in place while the cover 10 is closed.

Alternatively, the front panel 12 and back panel 14 of the cover 10 may be secured together by either Velcro straps, buttons, snaps, or tabs located on both of the front panel 12 and back panel 14 of the cover 10. As these types of securing mechanisms are generally less environmentally sustainable than the described elastic strap 40, preference is given towards the use of the elastic strap 40 to secure the front panel 12 and back panel 14 of the cover 10.

The present invention may be enclosed in an appropriately sized shipping box for delivery through normal distribution services. The size of the shipping box should be just large enough to accommodate the cover and sleeves. The shipping box should be constructed out of any durable, lightweight material, such as Kraft material.

As the use of optical media to store information becomes more widespread, there is certainly to be more developments in optical media in the future. As new types of optical media are developed to store digital information in new ways, the present invention is well suited to address the needs of distributing the optical media discs through the mail in mass quantities with minimal impact to the environment.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. Apparatus for packaging information storage discs, comprising:

a plurality of sleeves, wherein each sleeve comprises an open end and an interior;

a cover comprising a front panel, a back panel, an interior, and a scored spine;

means for securing said sleeves to said interior of cover; and means for securing said front panel of said cover to said back panel of cover.

2. The apparatus of claim 1, wherein the plurality of sleeves comprise Kraft material.

3. The apparatus of claim 1, wherein each of the plurality of sleeves comprise a white clay coating on the interior surface of the sleeve.

4. The apparatus of claim 1, wherein each of the said plurality of sleeves contains means to secure an optical media disc within the sleeve.

5. The apparatus of claim 4, wherein said means to secure an optical media disc within the sleeve is a bended corner.

6. The apparatus of claim 1, wherein the cover comprises Kraft material.

7. The apparatus of claim 1, wherein the cover further comprises a pocket secured to said interior of the cover.

8. The apparatus of claim 1, wherein the cover further comprises a plurality of holes; the plurality of sleeves further comprises a plurality of holes; and the means for securing said plurality of sleeves to said interior of cover comprises a plurality of elastic cords threaded through the plurality of holes in the sleeves, where each end of the plurality of elastic cords is attached to an object on an appropriate side of the plurality of holes in the cover that, from at least one perspective, is longer than the diameter of said hole in cover.

9. The apparatus of claim 1, wherein the means for securing said front panel of said cover to said back panel of said cover is an elastic strap.

10. The apparatus of claim 1, wherein the means for securing said front panel of said cover to said back panel of said cover is one member selected from the group consisting of Velcro straps, buttons, snaps, or a tab.

* * * * *